United States Patent
Lee et al.

(10) Patent No.: US 9,253,102 B2
(45) Date of Patent: Feb. 2, 2016

(54) TIME WEIGHTED QUEUING SCHEDULER FOR MACHINE-TO-MACHINE COMMUNICATIONS

(71) Applicant: Verizon Patent and Licensing Inc., Basking Ridge, NJ (US)

(72) Inventors: Jay J. Lee, San Ramon, CA (US); Gerard J. Flynn, Washington, NJ (US); Deepak Kakadia, Antioch, CA (US); Taher Farkhondeh, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 261 days.

(21) Appl. No.: 14/078,870

(22) Filed: Nov. 13, 2013

(65) Prior Publication Data

US 2015/0131434 A1     May 14, 2015

(51) Int. Cl.
*H04L 12/851*    (2013.01)
*H04L 12/801*    (2013.01)
*H04W 28/02*    (2009.01)

(52) U.S. Cl.
CPC ............ *H04L 47/2433* (2013.01); *H04L 47/12* (2013.01); *H04W 28/0268* (2013.01); *H04W 28/0289* (2013.01)

(58) Field of Classification Search
CPC .................................................. H04L 47/2433
USPC .................. 370/230, 412, 328, 428, 395.4
See application file for complete search history.

(56) References Cited

U.S. PATENT DOCUMENTS

| | | | |
|---|---|---|---|
| 2001/0014933 A1* | 8/2001 | Shibazaki et al. ............ | 711/154 |
| 2002/0059316 A1* | 5/2002 | Kettley et al. ................ | 707/200 |
| 2002/0176430 A1* | 11/2002 | Sangha et al. ................ | 370/412 |
| 2003/0076849 A1* | 4/2003 | Morgan et al. ............... | 370/412 |
| 2003/0112822 A1* | 6/2003 | Hong et al. ................... | 370/469 |
| 2004/0114602 A1* | 6/2004 | Ko et al. ..................... | 370/395.4 |
| 2006/0165111 A1* | 7/2006 | Varma ......................... | 370/428 |
| 2007/0168397 A1* | 7/2007 | Satyanarayana .............. | 707/200 |
| 2012/0051546 A1* | 3/2012 | Tsurumoto ................... | 380/270 |
| 2012/0141089 A1* | 6/2012 | Hunt ............................ | 386/239 |
| 2013/0242862 A1* | 9/2013 | Birlik .......................... | 370/328 |

* cited by examiner

*Primary Examiner* — Andrew Lai
*Assistant Examiner* — Andrew C Lee

(57) ABSTRACT

A device may receive machine-to-machine (M2M) traffic associated with two or more M2M applications. The M2M traffic may include information that identifies two or more priority levels associated with the M2M traffic. The device may determine parameters associated with managing the M2M traffic. The device may determine a traffic rate, an overall holding time, and an outgoing traffic rate associated with the M2M traffic. The device may determine a normalization factor based on the overall holding time and the parameters. The device may determine a set of priority level holding times based on the normalization factor, the overall holding time, and the parameters. Each priority level holding time may be associated with a priority level of the two or more priority levels. The device may manage the M2M traffic based on the set of priority level holding times and the outgoing traffic rate.

20 Claims, 10 Drawing Sheets

TIME WEIGHTED QUEUING SCHEDULER FOR MACHINE-TO-MACHINE COMMUNICATIONS

BACKGROUND

Machine-to-machine (M2M) communication is characterized by a large number of machines sharing information and making collaborative decisions without direct human interaction. As such, M2M communication may be a market changing force for a variety of real-time monitoring applications, such as healthcare, smart homes, environmental monitoring, industrial automation, and others.

DETAILED DESCRIPTION OF PREFERRED EMBODIMENTS

The following detailed description of example implementations refers to the accompanying drawings. The same reference numbers in different drawings may identify the same or similar elements.

M2M communication may allow a variety of applications (e.g., healthcare, utility, agriculture, etc.) to function effectively. However, M2M traffic, associated with M2M communication, is typically characterized by an infrequent, small burst transmission from a large number of M2M devices. As such, the level of M2M traffic may be random, unpredictable, and/or highly varied during any given period of time.

Moreover, M2M traffic associated one M2M application may have different quality of service ("QoS") requirements than M2M traffic associated with another application. For example, a first M2M application (e.g., a healthcare application, an emergency response application, etc.) may require a low latency for delivery of M2M data associated with the first M2M application, whereas a second M2M application (e.g., a utility application, an agriculture application, etc.) may not require a low latency level for the delivery of M2M data.

As a result of these characteristics, M2M traffic may provide challenges to a network that handles the M2M traffic. For example, a network may be over-dimensioned and/or under-dimensioned due to unpredictable traffic flows (e.g., where a predictable and/or steady traffic flow would allow for efficient network dimensioning). As an additional example, a network may be unable to prioritize M2M data, associated with different M2M applications, such that M2M data, associated with a particular M2M application, is treated in accordance with treatment level (e.g., a QoS treatment level) associated with the particular M2M application.

Implementations described herein may allow M2M traffic to be managed based on a priority level associated with the M2M traffic in a way such that the M2M traffic uses network resources in a steady and/or predictable manner.

Figure 1:
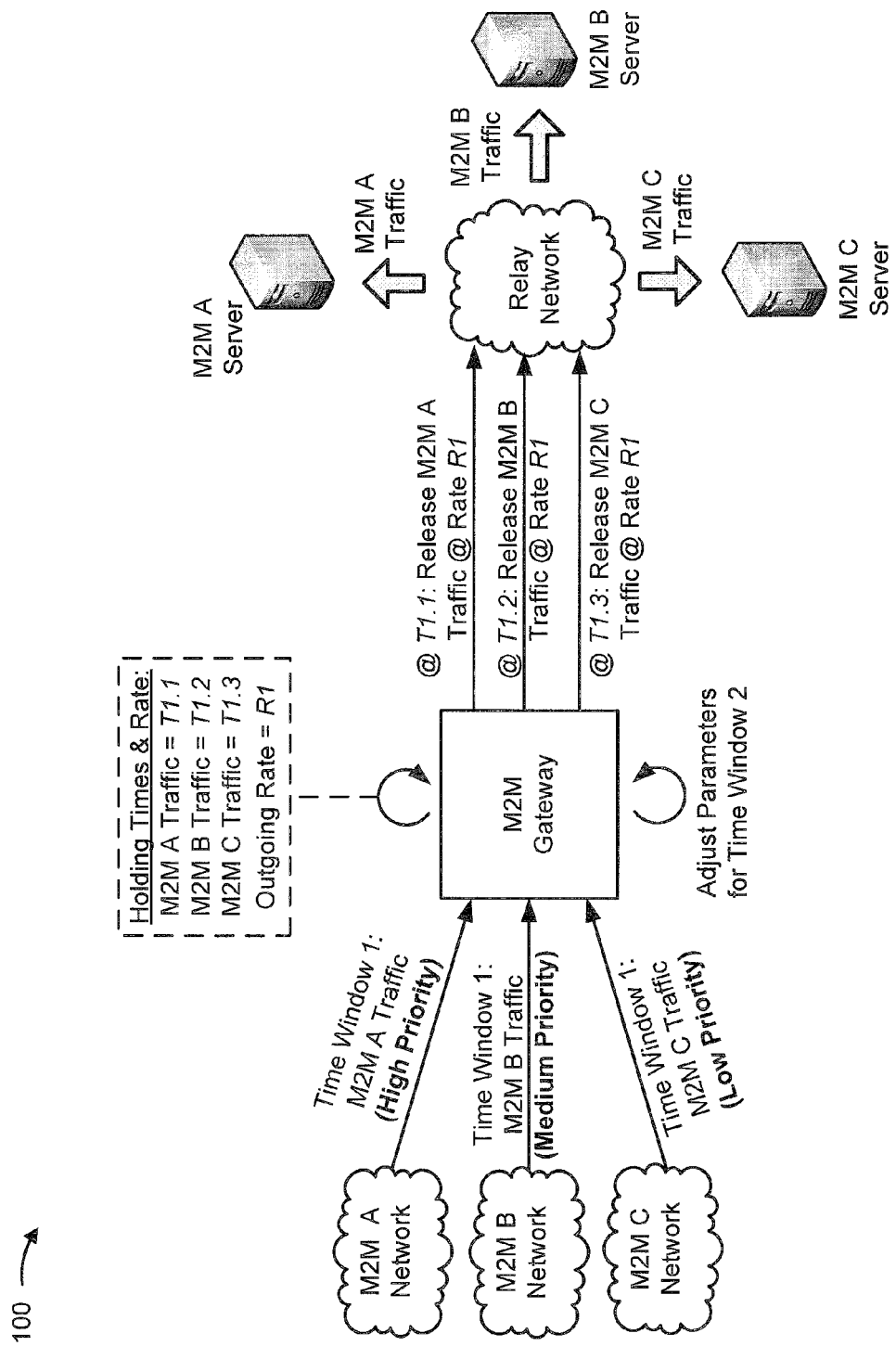
FIG. 1 is a diagram of an overview of an example implementation described herein.

FIG. 1 is a diagram of an overview of an example implementation 100 described herein. For the purposes of example implementation 100, assume that an M2M A network is configured to provide high priority M2M A traffic, associated an M2M A application, to an M2M A server via an M2M gateway and a relay network. Further, assume that an M2M B network is configured to provide medium priority M2M B traffic, associated with an M2M B application, to an M2M B server via the M2M gateway and the relay network. Finally, assume that an M2M C network is configured to provide low priority M2M C traffic, associated with an M2M C application, to an M2M C server via the M2M gateway and the relay network.

As shown in FIG. 1, the M2M A network may send, during a first time window, high priority M2M A traffic to the M2M gateway. As further shown, the M2M B network may send, during the first time window, medium priority M2M B traffic to the M2M gateway. As further shown, the M2M C network may send, during the first time window, low priority M2M C traffic to the M2M gateway.

As further shown in FIG. 1, the M2M gateway may receive, during the first time window, the M2M A traffic, the M2M B traffic, and the M2M C traffic, and may hold all of the traffic (e.g., the M2M gateway may prevent any M2M traffic from being sent to the relay network by assigning the high, medium, and low priority traffic to a high priority queue, a medium priority queue, and a low priority queue, respectively). As shown, the M2M gateway may determine, for the first time window and based on the amount of M2M traffic received, a holding time for the high priority M2M A traffic, T1.1. As further shown, the M2M gateway may also determine a holding time for the medium priority M2M B traffic, T1.2 (e.g., T1.2>T1.1). As also shown, the M2M gateway may also determine a holding time for the low priority M2M C traffic, T1.3 (e.g., T1.3>T1.2). In this way, the M2M gateway may ensure that the high priority M2M A traffic will be transmitted before the medium priority M2M B traffic (e.g., since T1.2>T1.1), and may ensure that the medium priority M2M B traffic is being transmitted before the low priority M2M C traffic (e.g., since T1.3>T1.2). Finally, the M2M gateway may determine an outgoing traffic rate for all of the M2M traffic (e.g., R1).

As further shown in FIG. 1, the M2M gateway may hold the M2M A traffic for a time period of T1.1, and may release (e.g., to the relay network) the M2M A traffic (e.g., assigned to the high priority queue) at rate R1 (e.g., after time T1.1 has passed). As further shown, the M2M gateway may hold the M2M B traffic for a time period of T1.2, and may release (e.g., to the relay network) the M2M B traffic (e.g., assigned to the medium priority queue) at rate R1 (e.g., after time T1.2 has passed). As also shown, the M2M gateway may hold the M2M C traffic for a time period of T1.3, and may release (e.g., to the relay network) the M2M C traffic (e.g., assigned to the low priority queue) at rate R1 (e.g., after time T1.3 has passed).

As further shown, the M2M gateway may determine that parameters, associated with determining priority level holding times and/or an outgoing traffic rate, are to be adjusted for a second time window (e.g., a time period immediately following the first time window), and M2M gateway may continue managing M2M traffic received during the second time window (e.g., and additional time windows) in the manner described above. In this way, M2M traffic may be managed based on a priority level, associated with the M2M traffic, such that the M2M traffic uses network resources in a steady and/or predictable manner. While systems and/or methods described herein focus on the treatment of on M2M traffic, these systems and/or methods may be equally applicable to other types of traffic.

Figure 2:
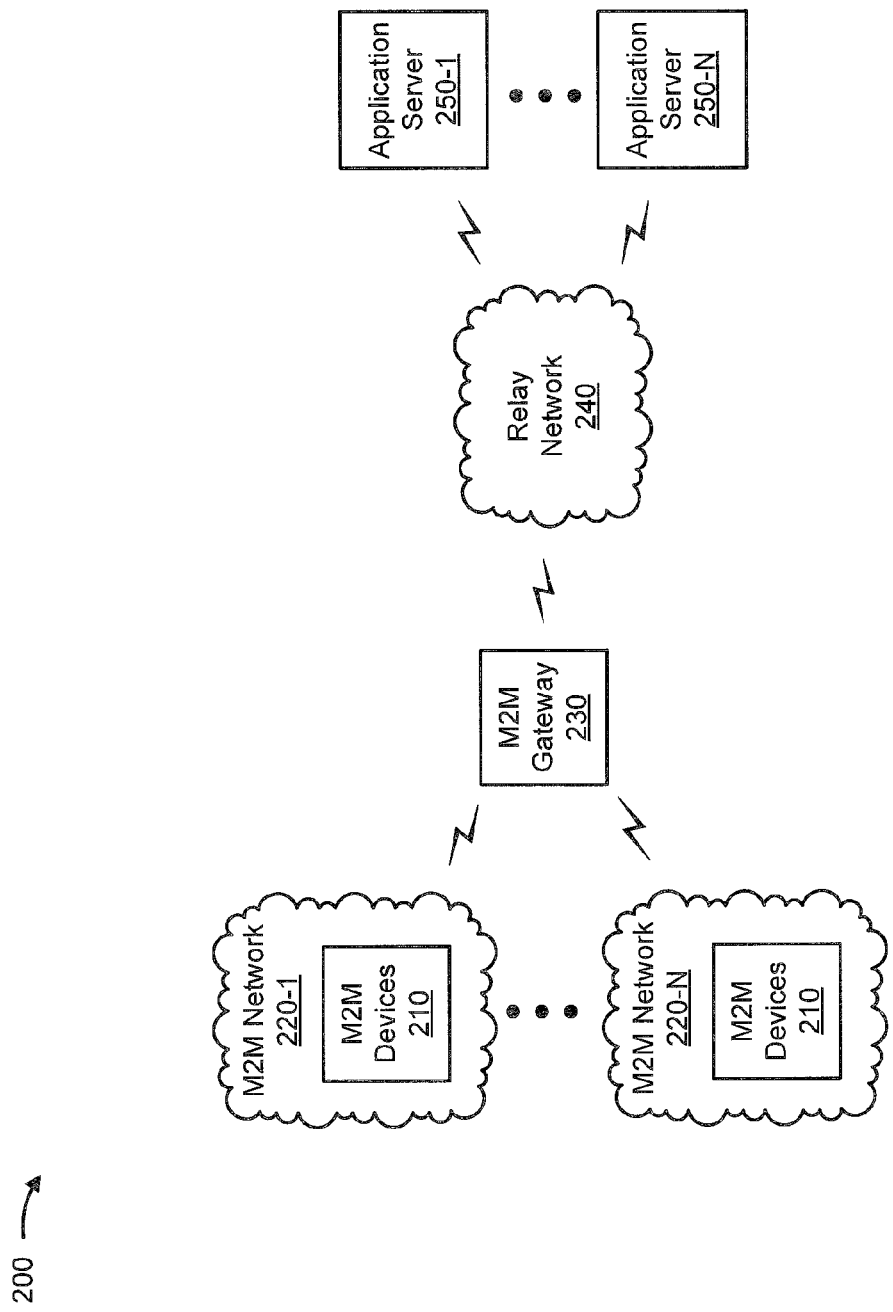
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include M2M devices 210, a set of M2M networks 220-1 through 220-N (N>1) (hereinafter collectively referred to as "M2M networks 220," and individually as "M2M network 220"), M2M gateway 230, relay network 240, and a set of application servers 250-1 through 250-N (hereinafter collectively referred to as "application servers 250," and individually as "application server 250").

M2M device 210 may include a device associated with receiving, generating, storing, processing, and/or providing M2M data associated with an M2M application. For example, M2M device 210 may include a network device (e.g., a modem, a switch, a gateway, etc.), a sensing device, a processing device, a metering device, and/or some other type of device. For example, M2M device 210 may include a device capable of monitoring and/or sensing M2M data in real-time. In some implementations, M2M device 210 may transmit the M2M data to M2M network 220, M2M gateway 230, and/or relay network 240. In some implementations, one or more M2M devices 210 may be included in M2M network 220.

M2M network 220 may include one or more wired and/or wireless networks associated with an M2M application. For example, M2M network 220 may include a cellular network, a public land mobile network ("PLMN"), a local area network ("LAN"), a wireless local area network ("WLAN" or "Wi-Fi network"), a wide area network ("WAN"), a metropolitan area network ("MAN"), an enterprise network, a telephone network, an ad hoc network, an intranet, the Internet, a fiber optic-based network, or a combination of these or other types of networks. In some implementations, M2M network 220 may include one or more M2M devices 210, and the one or more M2M devices 210 may communicate with M2M gateway 230 via M2M network 220. In some implementations, M2M network 220 may provide M2M traffic to M2M gateway 230 (e.g., traffic, associated with an M2M application, to be sent to application server 250). Additionally, or alternatively, M2M network 220 may send and/or receive M2M traffic via another M2M network 220 (e.g., another M2M network including another M2M device 210).

M2M gateway 230 may include a device capable of providing connectivity for M2M device 210 and/or M2M network 220 to relay network 240 and/or application server 250. For example, M2M gateway 230 may include one or more data processing and/or traffic transfer devices, such as a gateway, a router (e.g., an edge router, an access router, etc.), a modem, a switch, a firewall, a network interface card ("NIC"), a hub, a bridge, a server, an optical add/drop multiplexer ("OADM"), or any other type of device that processes and/or transfers traffic. In some implementations, M2M gateway 230 may include a device capable of sending and/or receiving M2M traffic, associated with M2M data, to and/or from M2M network 220 and/or relay network 240. Additionally, or alternatively, M2M gateway 230 may be capable of processing, handling, and/or managing M2M traffic based on an overall holding time, a priority level holding time, and/or an outgoing traffic rate determined by M2M gateway 230 and/or another device. In some implementations, one or more M2M gateways 230 may be included in relay network 240 (e.g., at the edge of relay network 240, at the interior of relay network 240, etc.). In some implementations, M2M gateway 230 may send and/or receive M2M traffic to and/or from multiple M2M networks 220.

Relay network 240 may include one or more wired and/or wireless networks. For example, relay network 240 may include a cellular network (e.g., a long term evolution ("LTE") network), a PLMN, a LAN, a WLAN, a WAN, a MAN, an enterprise network, a telephone network, an ad hoc network, an intranet, the Internet, a fiber optic-based network, or a combination of these or other types of networks. In some implementations, M2M gateway 230 may be included in relay network 240. In some implementations, relay network 240 may include one or more M2M gateways 230 and/or one or more other devices associated with routing M2M traffic, associated with M2M network 220 and/or M2M device 210, to application server 250.

Application server 250 may include a device, such as a server, that hosts and/or provides an M2M application service. In some implementations, application server 250 may receive, generate, store, process, and/or provide M2M data, associated with M2M traffic, provided by M2M devices 210 (e.g., via M2M gateway 230 and/or relay network 240). In some implementations, application server 250 may provide the M2M data, in real-time, to another device associated with the M2M application.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
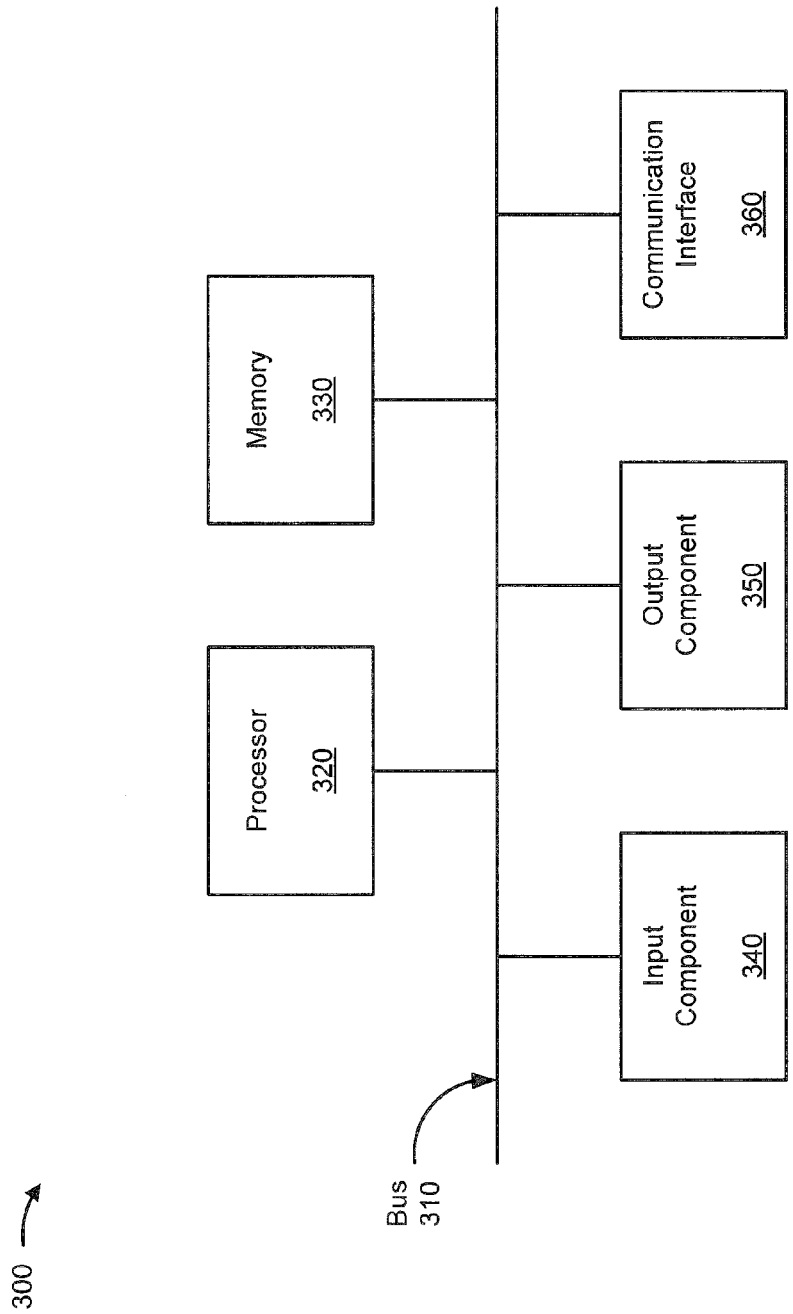
FIG. 3 is a diagram of example components of one or more devices of FIG. 2.

FIG. 3 is a diagram of example components of a device 300. Device 300 may correspond to M2M device 210, M2M gateway 230, and/or application server 250. Additionally, or alternatively, each of M2M device 210, M2M gateway 230, and/or application server 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
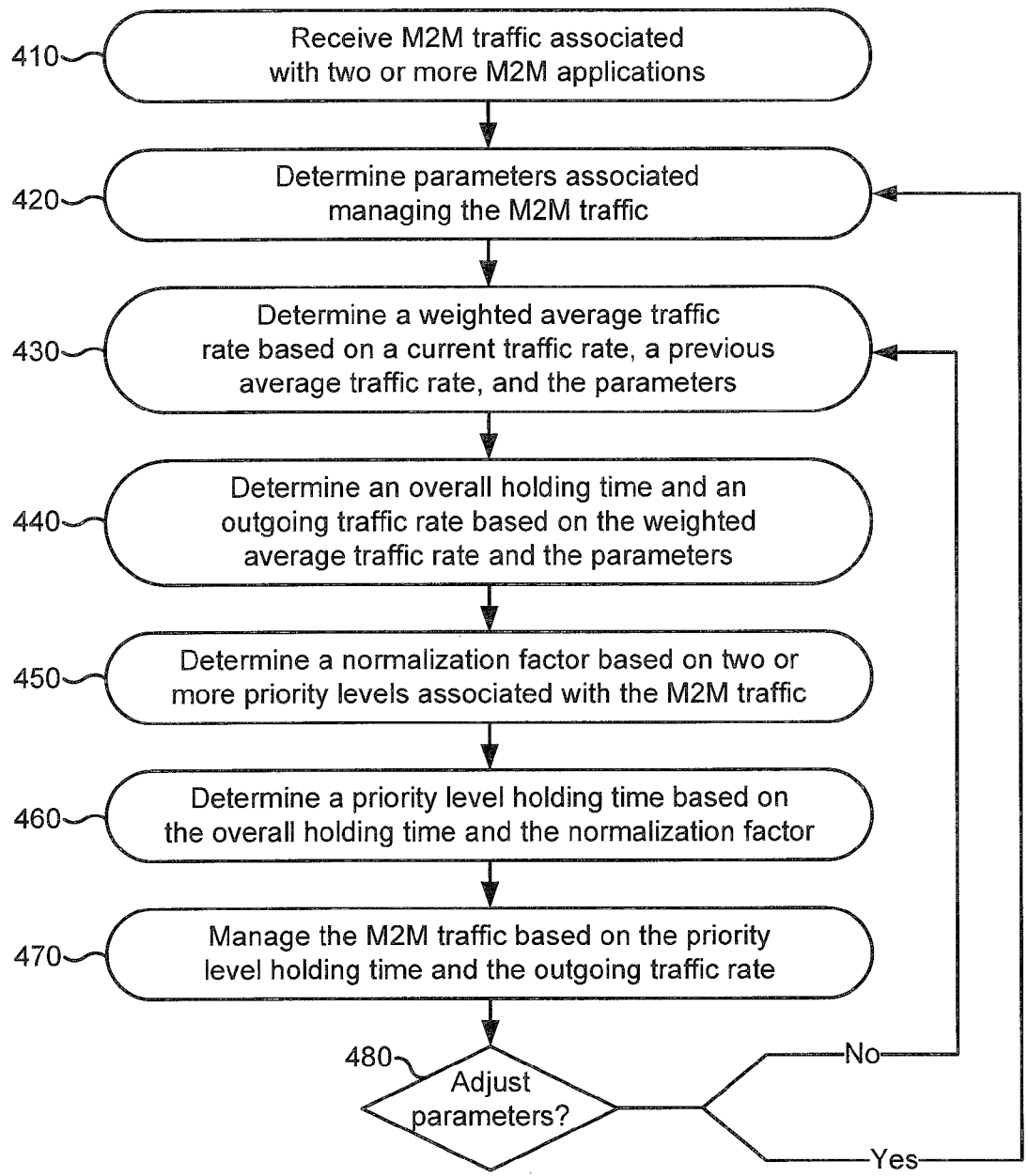
FIG. 4 is a flow chart of an example process for managing M2M traffic based on a priority level holding time and an outgoing traffic rate.

FIG. 4 is a flow chart of an example process 400 for managing M2M traffic based on a priority level holding time and an outgoing traffic rate. In some implementations, one or more process blocks of FIG. 4 may be performed by M2M gateway 230. In some implementations, one or more process blocks of FIG. 4 may be performed by another device or a group of devices separate from or including M2M gateway 230, such as a device (e.g., a router, a gateway, a server, etc.) or a group of devices included in relay network 240.

As shown in FIG. 4, process 400 may include receiving M2M traffic associated with two or more M2M applications (block 410). For example, M2M gateway 230 may receive M2M traffic, associated with two or more M2M applications, via M2M network 220. In some implementations, M2M device 210, associated with a particular M2M application, may receive M2M data (e.g., by monitoring and/or sensing the M2M data), and may send M2M traffic (e.g., including the M2M data associated with the particular M2M application) to M2M gateway 230. Additionally, or alternatively, M2M gateway 230 may receive the M2M traffic from another device included in M2M network 220.

M2M traffic may include traffic associated with two or more M2M applications. For example, M2M device 210 (e.g., associated with a particular M2M application) may receive, generate, determine, process, and/or provide data, associated with the particular M2M application, and may send M2M traffic to M2M network 220 and/or M2M gateway 230. In some implementations the M2M traffic, associated with a particular M2M application, may be used by application server 250, associated with the particular M2M application, to manage, operate, and/or provide the M2M application. In some implementations, the M2M traffic may include data associated with two or more M2M applications (e.g., different M2M networks 220 may provide M2M traffic, associated with different M2M applications, to M2M gateway 230).

In some implementations, the M2M traffic may be associated with one or more priority levels. For example, M2M gateway 230 may receive (e.g., during a first time window) a first M2M traffic flow, associated with a first M2M application, that includes (e.g., in a data packet header associated with the traffic, etc.) information indicating that M2M data included in the first M2M traffic flow is associated with a first priority level (e.g., a high priority level, a medium priority level, a low priority level, a QoS treatment level, etc.). In this example, M2M gateway 230 may also receive (e.g., during the first time window) a second M2M traffic flow, associated with a second M2M application, that includes information indicating that M2M data included in the second M2M traffic flow is associated with a second priority level.

In some implementations, the priority level may indicate a manner in which M2M gateway 230 is to manage the M2M traffic. For example, the priority level may be associated with a level of treatment (e.g., a level of QoS treatment, etc.) associated with the M2M traffic (e.g., when the M2M traffic is associated with an M2M application that requires a particular level of latency, when the M2M traffic is associated with an M2M application that requires a particular level of drop precedence; i.e., which packets should be dropped first in case of congestion, etc.). In some implementations, the priority level, associated with the M2M traffic, may be identified using a string of characters (e.g., high, medium, low, etc.), a numerical value (e.g., 1, 2, 3, etc.), or the like. In some implementations, the priority level may be indicated by a Differentiated Service (DS) field (e.g., a six bit DS field) in an internet protocol ("IP") packet header associated with the M2M traffic, and, using bits associated with the DS field, the M2M traffic may be marked for an appropriate priority level and may be identified for necessary treatment. The DS field may include up to 64 (i.e., $2^6$) different Differentiated Services Code Point (DSCP) values that may be used to mark the M2M traffic for priority levels and may be used to identify the priority levels of traffic for required treatment. In practice, however, only subset of DSCP values may be used (e.g., a subset including 15 DSCP values).

In some implementations, the M2M traffic, associated with a priority level, may be assigned to a queue (e.g., a high priority queue, a medium priority queue, a low priority queue, etc.) based on the priority level (e.g., priority level 1 traffic may be assigned to the high priority queue, priority level 2 traffic may be assigned to the medium priority queue, priority level three traffic may be assigned to the low priority queue, etc.).

As further shown in FIG. 4, process 400 may include determining parameters associated with managing the M2M traffic (block 420). For example, M2M gateway 230 may determine parameters associated with managing the M2M traffic received from M2M networks 220. In some implementations, M2M gateway 230 may determine the parameters when M2M gateway 230 receives the M2M traffic from M2M networks 220 and/or M2M devices 210. Additionally, or alternatively, M2M gateway 230 may determine the parameters when an outgoing traffic rate, determined by M2M gateway 230, satisfies a threshold (e.g., when an amount of M2M traffic has changed such that adjusted parameters are required). Additionally, or alternatively, M2M gateway 230 may determine the parameters when an overall holding time, determined by M2M gateway, satisfies a threshold. Additionally, or alternatively, M2M gateway 230 may determine the parameters when M2M gateway 230 receives a notification, from relay network 240, indicating that the parameters are to be adjusted.

In some implementations, M2M gateway 230 may determine the parameters based on information stored by M2M gateway 230. For example, M2M gateway 230 may store, in a memory location associated with M2M gateway 230, information identifying the parameters, and M2M gateway 230 may determine the parameters based on the stored information. Additionally, or alternatively, M2M gateway 230 may determine the parameters based on information received from relay network 240. For example, M2M gateway 230 may receive M2M traffic from M2M network 220, and may query a device associated with relay network 240 to determine the parameters. The device associated with relay network 240 may determine the parameters (e.g., based on information stored by a device included in relay network 240) and may provide the parameters to M2M gateway 230 (e.g., via relay network 240).

Parameters associated with managing the M2M traffic may include information (e.g., a numerical value) used to determine an overall holding time (e.g., a period of time that M2M gateway 230 may hold the M2M traffic before sending the M2M traffic to relay network 240), a priority level holding time (e.g., a period of time that M2M gateway 230 may hold M2M traffic, associated with a particular priority level and/or queue, before sending the M2M traffic to relay network 240), and/or an outgoing traffic rate (e.g., a rate at which M2M gateway 230 may send the M2M traffic to relay network 240) to be applied to the M2M traffic. For example, the parameters may include information associated with determining the outgoing traffic rate (e.g., a link speed, a link speed factor, an effective link speed, etc.), information associated with determining a current traffic rate, a previous average traffic rate, and/or a weighted average traffic rate (e.g., a time window size, a weight constant, etc.), information associated with determining the overall holding time associated with the M2M traffic (e.g., a buffer size, a buffer size factor, an effective buffer size, etc.), information associated with determining the priority level holding time (e.g., a high priority level factor, a medium priority level factor, a low priority level factor, etc.), or the like.

As further shown in FIG. 4, process 400 may include determining a weighted average traffic rate based on a current traffic rate, a previous average traffic rate, and the parameters (block 430). For example, M2M gateway 230 may determine a weighted average traffic rate based on a current traffic rate, a previous average traffic rate, and the parameters. In some implementations, M2M gateway 230 may determine the weighted average traffic rate when M2M gateway 230 determines the parameters associated with managing the M2M traffic. Additionally, or alternatively, M2M gateway 230 may determine the weighted average traffic rate when M2M gateway 230 receives the M2M traffic from M2M network 220. Additionally, or alternatively, M2M gateway 230 may determine the weighted average traffic rate when M2M gateway 230 receives, from relay network 240, an indication that M2M gateway 230 is to send M2M traffic to relay network 240.

A weighted average traffic rate may include a traffic rate, associated with a current time window, that identifies a weighted average rate of M2M traffic during the current time window and a previous time window. In some implementations, the weighted average traffic rate may be used to determine the overall holding time and the outgoing traffic rate to be applied to the M2M traffic received by M2M gateway 230. In some implementations, the weighted average traffic rate may be determined based on a time window size, a current traffic rate, a previous average traffic rate, and/or a weight factor.

A time window size may include a length of time, associated with a time window (e.g., a period of time), that M2M gateway 230 may monitor the M2M traffic. For example, M2M gateway 230 may monitor a quantity of data (e.g., a quantity of kilobits, a quantity of megabits, etc.) received during a time window of a particular time window size (e.g., 100 seconds, 5 minutes, etc.) to determine a data rate (e.g., bits per second ("bit/s"), etc.) associated with the time window. In some implementations, M2M gateway 230 may monitor the M2M traffic during multiple (e.g., successive) time windows.

A current traffic rate may include a rate at which M2M traffic is received during a current time window (e.g., the most recent time window). In some implementations, M2M gateway 230 may determine the current traffic rate by dividing a quantity of data, received during the current time window, by the time window size of the current time window.

A previous average traffic rate may include an average traffic rate, associated with one or more previous time windows. For example, the M2M gateway 230 may determine an average traffic rate associated with a first, a second, and a third time window. In this example, the average traffic rate associated with the first, the second, and the third time window may correspond to the previous average traffic rate when M2M gateway 230 is determining an outgoing traffic rate associated with a fourth time window. In some implementations, M2M gateway 230 may determine the previous average traffic rate based on information stored by M2M device 230 (e.g., based on information associated with a previous computation associated with one or more previous time windows). In some implementations, the previous average traffic rate may include a default previous average traffic rate (e.g., where no previous computations, associated with the M2M traffic, have been performed).

In some implementations, the previous average traffic rate, associated with a current time window, may be equal to the weighted average traffic rate associated with a previous time window. For example, M2M gateway 230 may determine a weighted average traffic rate for M2M traffic during a first time window. When M2M gateway 230 is to determine a weighted average traffic rate for M2M traffic during a second time window (e.g., where the second time window immediately follows the first time window), the previous average traffic rate associated with the second time window may be equal to the weighted average traffic rate associated with the first time window.

A weight factor may include a value (e.g., a numerical value), that may be applied to the current traffic rate and/or the previous average traffic rate to indicate the relative importance of the current traffic rate and/or the previous average traffic rate when determining the weighted average traffic rate (e.g., a smaller weight factor may indicate less importance than a higher weight factor).

In some implementations, M2M gateway 230 may determine the weighted average traffic rate by performing a computation associated with the current traffic rate, the previous average traffic rate, and the weight factor. In one example implementation, M2M gateway 230 may determine the weighted average traffic rate in the following manner:

(1) Multiplying the current traffic rate by the weight factor (e.g., where the weight factor is a numerical value between 0 and 1);

(2) Multiplying the previous average traffic rate by a value associated with the weight factor (e.g., one minus the weight factor); and (3) Summing the results of (1) and (2).

In another example implementation, M2M gateway 230 may determine the weighted average traffic rate using some other function, such as a function that determines the average of the current traffic rate and the previous average traffic rate.

As further shown in FIG. 4, process 400 may include determining an overall holding time and an outgoing traffic rate based on the weighted average traffic rate and the parameters (block 440). For example, M2M gateway 230 may determine an overall holding time and an outgoing traffic rate, to be applied to the M2M traffic received from M2M networks 220, based on the current weight average traffic rate and the parameters. In some implementations, M2M gateway 230 may determine the overall holding time and the outgoing traffic rate when M2M gateway 230 determines the weighted average traffic rate. Additionally, or alternatively, M2M gateway 230 may determine the overall holding time and the outgoing traffic rate when M2M gateway 230 receives the M2M traffic from M2M networks 220. Additionally, or alternatively, M2M gateway 230 may determine the overall holding time and the outgoing traffic rate when M2M gateway 230 receives, from relay network 240, an indication that M2M gateway 230 is to send M2M traffic to relay network 240.

An overall holding time may include a length of time that M2M gateway 230 may hold (e.g., before sending) the M2M traffic, received by M2M gateway 230 during a time window, after the time window expires (e.g., without consideration of a priority level associated with the M2M traffic). In some implementations, M2M gateway 230 may determine the overall holding time based on the weighted average traffic rate, the time window size, an effective link speed, and/or an effective buffer size.

An effective link speed may include a maximum outgoing traffic rate that M2M gateway 230 may send the M2M traffic to relay network 240. In some implementations, the effective link speed and/or information associated with the effective link speed (e.g., a maximum link speed, a link speed factor) may be included in the parameters. In some implementations, M2M gateway 230 may determine the effective link speed based on the maximum link speed and the link speed factor (e.g., a numerical value between 0 and 1). For example, M2M gateway 230 may determine the effective link speed by multiplying the maximum link speed by the link speed factor.

An effective buffer size may include a maximum quantity of memory that M2M gateway 230 may use to hold the M2M traffic before sending the M2M traffic to relay network 240. In some implementations, the effective buffer size and/or information associated with the effective buffer size (e.g., a maximum buffer size, a buffer size factor) may be included in the parameters. In some implementations, M2M gateway 230 may determine the effective buffer size based on the maximum buffer size and the buffer size factor (e.g., a numerical value between 0 and 1). For example, M2M gateway 230 may determine the effective buffer size by multiplying the maximum buffer size by the buffer size factor.

In some implementations, M2M gateway 230 may determine the overall holding time by performing a computation associated with the effective link speed, the time window size, the effective buffer size, and/or the weighted average traffic rate. In one example implementation, M2M gateway 230 may determine the overall holding time in the following manner:

(1) Multiplying the effective link speed by the time window size;

(2) Adding the effective buffer size to the result of (1); and (3) Dividing the result of (2) by the weighted average traffic rate.

An outgoing traffic rate may include a rate at which M2M gateway 230 may release the M2M traffic (e.g., after the overall holding time and/or a priority level holding time has passed). In some implementations, M2M gateway 230 may determine the outgoing traffic rate based on comparing the weighted average traffic rate and the effective link speed. For example, M2M gateway 230 may determine that if the weighted average traffic rate is less than the effective link speed, then the outgoing traffic rate is to be equal to the weighted average traffic rate. As an additional example, M2M gateway 230 may determine that if the weighted average traffic rate is greater than or equal to the effective link speed, then the outgoing traffic rate is to be equal to the effective link speed.

As further shown in FIG. 4, process 400 may include determining a normalization factor based on two or more priority levels associated with the M2M traffic (block 450). For example, M2M gateway 230 may determine a normalization factor based on two or more priority levels associated with the M2M traffic received from M2M networks 220. In some implementations, M2M gateway 230 may determine the normalization factor when M2M gateway 230 determines the overall holding time and/or the outgoing traffic rate. Additionally, or alternatively, M2M gateway 230 may determine the normalization factor when M2M gateway 230 receives the M2M traffic from M2M networks 220. Additionally, or alternatively, M2M gateway 230 may determine the normalization factor when M2M gateway 230 receives, from relay network 240, an indication that M2M gateway 230 is to send M2M traffic to relay network 240.

A normalization factor may include a value (e.g., a numerical value) associated with calculating a priority level holding time for M2M traffic assigned to a queue (e.g., a high priority traffic queue, a medium priority traffic queue, a low priority traffic queue, etc.) associated with the priority level. In some implementations, the normalization factor and/or information associated with the normalization factor (e.g., two or more priority level factors) may be included in the parameters. A priority level factor may include a value (e.g., a numerical value) associated with a priority level, that may be used to calculate the normalization factor and/or a priority level holding time. In some implementations, M2M gateway 230 may determine the normalization factor based on the overall holding time and the priority level factors (e.g., when the priority level factors are numerical values between 0 and 1). For example, M2M gateway 230 may determine the normalization factor in the following manner:

(1) Dividing the overall holding time by a first priority level factor associated with a first priority level;

(2) Repeating (1) for each additional priority level factor (e.g., a second priority level factor, a third priority level factor, etc.);

(3) Summing the results of (1) and (2); and (4) Dividing the overall holding time by the result of (3).

In another example implementation, M2M gateway 230 may determine the normalization factor using some other function, such as a function that determines the two or more priority level factors.

As further shown in FIG. 4, process 400 may include determining a priority level holding time based on the overall holding time and the normalization factor (block 460). For example, M2M gateway 230 may determine a priority level holding time based on the overall holding time, the priority level factor associated with the priority level, and/or the normalization factor determined by M2M gateway 230. In some implementations, M2M gateway 230 may determine the priority level holding time when M2M gateway 230 determines the normalization factor (e.g., after M2M gateway 230 determines the normalization factor). Additionally, or alternatively, M2M gateway 230 may determine the priority level holding time when M2M gateway 230 receives the M2M traffic from M2M networks 220. Additionally, or alternatively, M2M gateway 230 may determine the priority level holding time when M2M gateway 230 receives, from relay network 240, an indication that M2M gateway 230 is to send M2M traffic to relay network 240.

A priority level holding time may include a length of time that M2M gateway 230 may hold (e.g., in a queue associated with the priority level) the M2M traffic, associated with a priority level and received by M2M gateway 230 during a time window, after the time window expires. In some implementations, M2M gateway 230 may determine two or more priority level holding times associated with two more queues (e.g., when M2M gateway 230 receives M2M traffic associated with two different priority levels and/or priority level factors). In some implementations, M2M gateway 230 may determine the priority level holding time based on the overall holding time, the normalization factor, and the priority level factor (e.g., a numerical value, between 0 and 1, associated with the priority level). For example, M2M gateway 230 may determine the priority level holding time for each priority level (e.g., associated with each queue) in the following manner:

(1) Dividing the overall holding time by a first priority level factor associated with a first priority level;
(2) Multiplying (1) by the normalization factor; and
(3) Repeating (1) and (2) for each additional priority level.

In this manner, M2M gateway 230 may determine a priority level holding time for M2M traffic associated with each priority level identified in the M2M traffic (e.g., M2M gateway 230 may determine a different priority level holding time for different queues associated with different priority levels). Additionally, or alternatively, M2M gateway 230 may determine the priority level holding time using some other function.

As further shown in FIG. 4, process 400 may include managing the M2M traffic based on the priority level holding times and the outgoing traffic rate (block 470). For example, M2M gateway 230 may manage the M2M traffic, received from M2M network 220, based on the priority level holding time and the outgoing traffic rate determined by M2M gateway 230. In some implementations, M2M gateway 230 may manage the M2M traffic when M2M gateway 230 determines the priority level holding time and/or the outgoing traffic rate. Additionally, or alternatively, M2M gateway 230 may manage the M2M traffic when M2M gateway 230 receives, from relay network 240, an indication that M2M gateway 230 is to send the M2M traffic to relay network 240.

Managing the M2M traffic may include holding (e.g., in two or more queues) the M2M traffic (e.g., in accordance with two or more priority level holding times), and/or releasing the M2M traffic (e.g., at the outgoing traffic rate). For example, M2M gateway 230 may determine two or more priority level holding times and the outgoing traffic rate, associated with the M2M traffic, and may hold M2M traffic in a queue associated with a first priority level (e.g., prevent the M2M traffic from being sent to relay network 240) for a length of time equal to a first priority level holding time. M2M gateway 230 may release the M2M traffic associated with the first priority level holding time (e.g., send the M2M traffic to relay network 240) at a data rate equal to the outgoing traffic rate when the first priority level holding time has passed. M2M gateway 230 may repeat this process for M2M traffic, associated with a second priority level, assigned to a second queue (e.g., based on second priority level holding time and the outgoing traffic rate).

As further shown in FIG. 4, process 400 may include determining whether the parameters are to be adjusted (block 480). For example, M2M gateway 230 may determine whether the parameters are to be adjusted. In some implementations, M2M gateway 230 may determine whether the parameters are to be adjusted when M2M gateway 230 determines the priority level holding times and/or the outgoing traffic rate.

In some implementations, M2M gateway 230 may determine whether the parameters are to be adjusted based on the overall holding time, the priority level holding times, and/or the outgoing traffic rate. For example, M2M gateway 230 may determine that the overall holding time, the priority level holding times, and/or the outgoing traffic rate (e.g., computed by M2M gateway 230) satisfy a threshold (e.g., where the parameters are to be adjusted when the threshold is satisfied). Additionally, or alternatively, M2M gateway 230 may determine that the parameters are to be adjusted based on information received from relay network 240 (e.g., where relay network 240 provides information indicating the parameters are to be adjusted). Additionally, or alternatively, M2M gateway 230 may determine whether the parameters are to be adjusted based on information stored by M2M gateway 230. In some implementations, M2M gateway 230 may store information indicating that the parameters are to be adjusted based on a particular time (e.g., a periodic adjustment, a particular time of day, etc.), a particular condition associated with the M2M traffic (e.g., a peak traffic rate, a threshold quantity of data is received, etc.), or the like.

As further shown in FIG. 4, if the parameters are to be adjusted (block 480-YES), then process 400 may return to block 420. For example, M2M gateway 230 may determine that the parameters are to be adjusted, and M2M gateway 230 may determine the adjusted parameters, associated with the M2M traffic, as discussed above.

As further shown in FIG. 4, if the parameters are not to be adjusted (block 480-NO), then process 400 may return to block 430. For example, M2M gateway 230 may determine that the parameters are not to be adjusted, and M2M gateway 230 may determine a weighted average traffic rate (e.g., for a next time window), as discussed above.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

FIGS. 5A-5F are diagrams of an example implementation 500 relating to example process 400 shown in FIG. 4. For the purposes of example implementation 500, assume that an AgriCorp network, associated with an AgriCorp M2M application (e.g., an agriculture application) and a group of M2M devices, is configured to provide priority level 3 (e.g., low priority) M2M data, associated with the AgriCorp M2M application, to M2M gateway 230. Further, assume that a HealthLine network, associated with a HealthLine M2M application (e.g., a healthcare application) and a group of M2M devices, is configured to provide priority level 1 (e.g., high priority) M2M data, associated with the HealthLine M2M application, to M2M gateway 230. Also, assume that assume that a PowerCo network, associated with a PowerCo M2M application (e.g., a utility application) and a group of M2M devices, is configured to provide priority level 2 (e.g., medium priority) M2M data, associated with the PowerCo M2M application, to M2M gateway 230. Finally, assume that the M2M traffic is sent in an unpredictable manner.

Figure 5A:
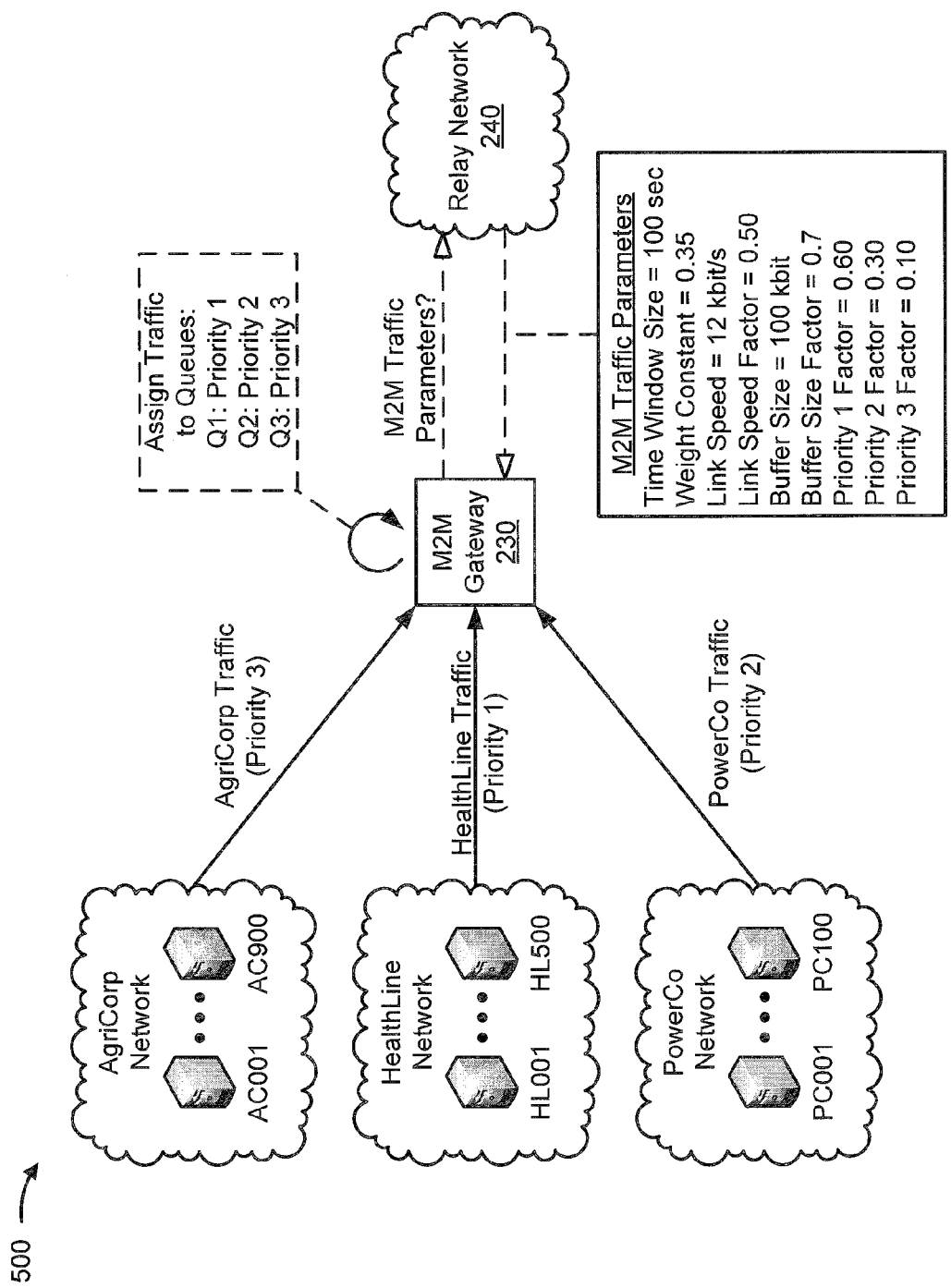
FIGS. 5A-5F are diagrams of an example implementation relating to the example process shown in FIG. 4.

As shown in FIG. 5A, M2M devices, associated with the AgriCorp application, may send priority 3 AgriCorp M2M traffic, via the AgriCorp network, to M2M gateway 230 (e.g., during a first time window). As also shown, M2M devices, associated with the HealthLine application, may send priority 1 HealthLine M2M traffic, via the HealthLine network, to M2M gateway 230 (e.g., during the first time window). As further shown, M2M devices, associated with the PowerCo application, may send priority 2 PowerCo M2M traffic, via the PowerCo network, to M2M gateway 230 (e.g., during the first time window).

As shown, M2M gateway 230 may query relay network 240 to determine M2M traffic parameters that are to be applied to the AgriCorp traffic, the Healthline traffic, and the PowerCo traffic. As shown, relay network 240 may send the M2M traffic parameters (e.g., stored by a device included in relay network 240) to M2M gateway 230. As shown, the M2M traffic parameters may indicate a time window size of 100 seconds ("sec"), a weight constant of 0.35, a link speed of 12 kilobits per second ("kbit/s"), a link speed factor of 0.50, a buffer size of 100 kilobits ("kbits"), a buffer size factor of 0.7, a priority 1 factor of 0.60, a priority 2 factor of 0.30, and a priority 3 factor of 0.10. As further shown, M2M gateway 230 may assign each traffic flow to a queue based on the priority level associated with each traffic flow (e.g., HealthLine traffic is assigned to Q1, PowerCo traffic is assigned to Q2, AgriCorp traffic is assigned to Q3).

Figure 5B:
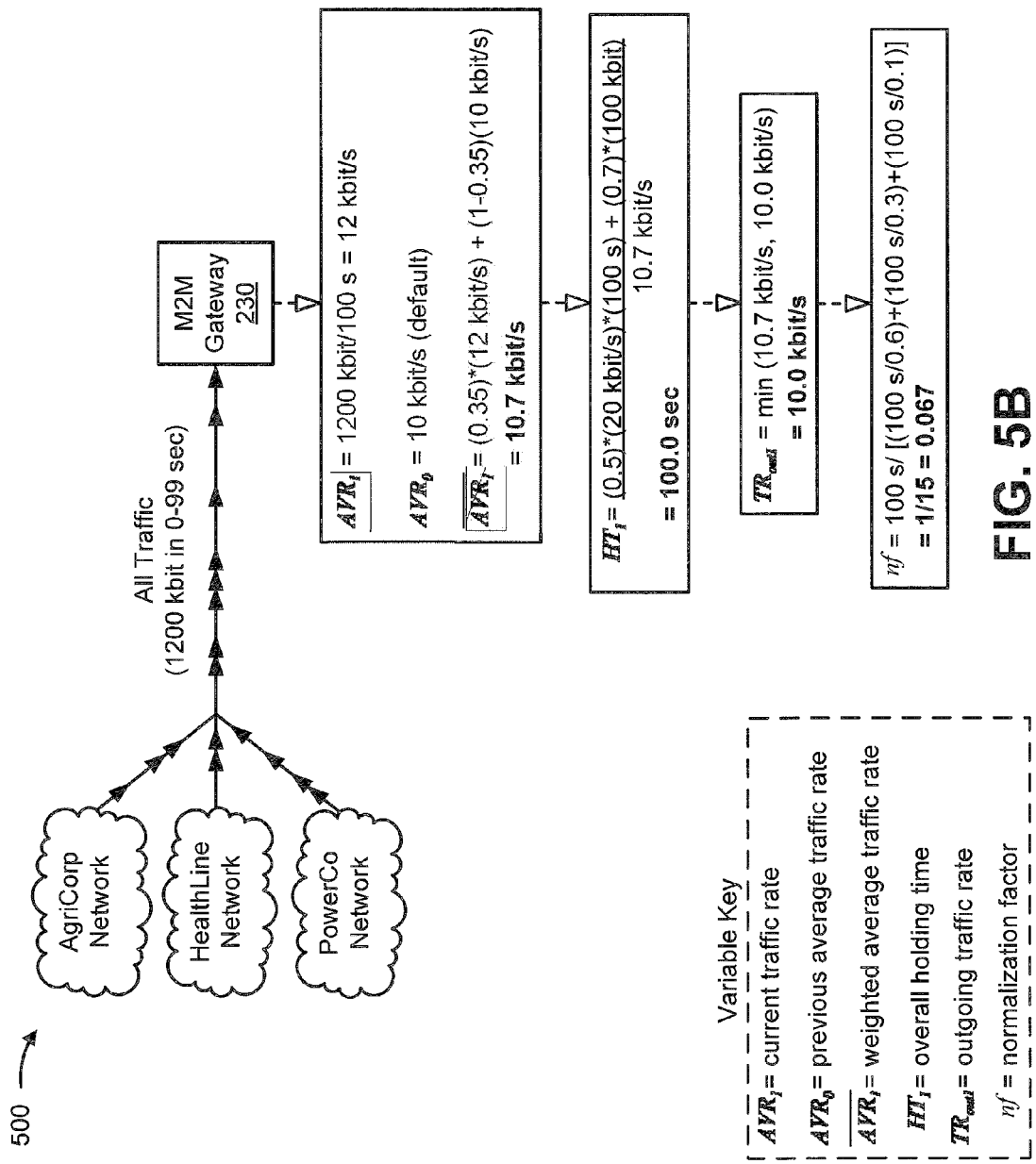

For the purposes of FIG. 5B, assume that M2M gateway 230 stores information indicating that a default previous average traffic rate of 10 kbit/s is to be used to determine an overall holding time and the outgoing traffic rate ("$AVR_0$") associated with the M2M traffic (e.g., since M2M gateway 230 is determining the overall holding time and the outgoing traffic rate for a first time window after M2M gateway 230 begins receiving the M2M traffic).

As shown in FIG. 5B, assume M2M gateway 230 receives 1200 kbits of data during the first 100 second time window (e.g., measured from when M2M gateway 230 begins receiving the three M2M traffic flows). M2M gateway 230 may determine the current traffic rate ("$AVR_1$") based on the 1200 kbits of data and the 100 second time window. As shown, M2M gateway 230 may determine that the current traffic rate is 12 kbit/s (e.g., 1200 kbit/100 s=12 kbit/s).

M2M gateway 230 may determine the weighted average traffic rate ("$\overline{AVR_1}$") based on the current traffic rate (e.g., 12 kbit/s), the previous average traffic rate (e.g., 10 kbit/s), and the weight factor (e.g., 0.35). As shown, M2M gateway 230 may determine that the weighted average traffic rate is 10.7 kbit/s (e.g., (0.35×12 kbit/s)+((1−0.35)×10 kbit/s)=10.7 kbit/s).

As further shown in FIG. 5B, M2M gateway 230 may determine the overall holding time ("$HT_1$") for the M2M traffic received during the first time window. As shown, M2M gateway 230 may determine the overall holding time based on the link speed factor (e.g., 0.5), the link speed (e.g., 20 kbit/s), the time window size (e.g., 100 sec), the buffer size factor (e.g., 0.7), the buffer size (e.g., 100 kbit), and the weighted average traffic rate (e.g., 10.7 kbit/s). As shown, M2M gateway 230 may determine that the overall holding time for the M2M traffic received during the first time window is 100.0 seconds (e.g., [(0.5×12 kbit/s×100 s)+(0.7×100 kbit)]/10.7 kbit/s=100.0 sec).

As further shown, M2M gateway 230 may determine the outgoing traffic rate ("$TR_{out1}$") for the M2M traffic received during the first time window. As shown, M2M gateway 230 may determine the outgoing traffic rate based on the minimum of the weighted average traffic rate (e.g., 10.7 kbit/s) and the effective link speed (e.g., 0.5×20 kbit/s=10.0 kbit/s). As shown, M2M gateway 230 may determine that the outgoing traffic rate for the M2M traffic received during the first time window is 10.0 kbit/s (e.g., since 10.0 kbit/s is less than 10.7 kbit/s).

As further shown in FIG. 5B, M2M gateway 230 may determine the normalization factor ("nf") associated with the M2M traffic received during the first time window. As shown, M2M gateway 230 may determine that the normalization factor based on the overall holding time (e.g., 100 sec), the priority 1 factor (e.g., 0.6), the priority 2 factor (e.g., 0.3), and the priority 3 factor (e.g., 0.1). As shown, M2M gateway 230 may determine that the normalization factor for the M2M traffic received during the first time window is ⅟15 (e.g., 100 s/[(100 s/0.6)+(100 s/0.3)+(100 s/0.1)]=⅟15=0.067).

Figure 5C:
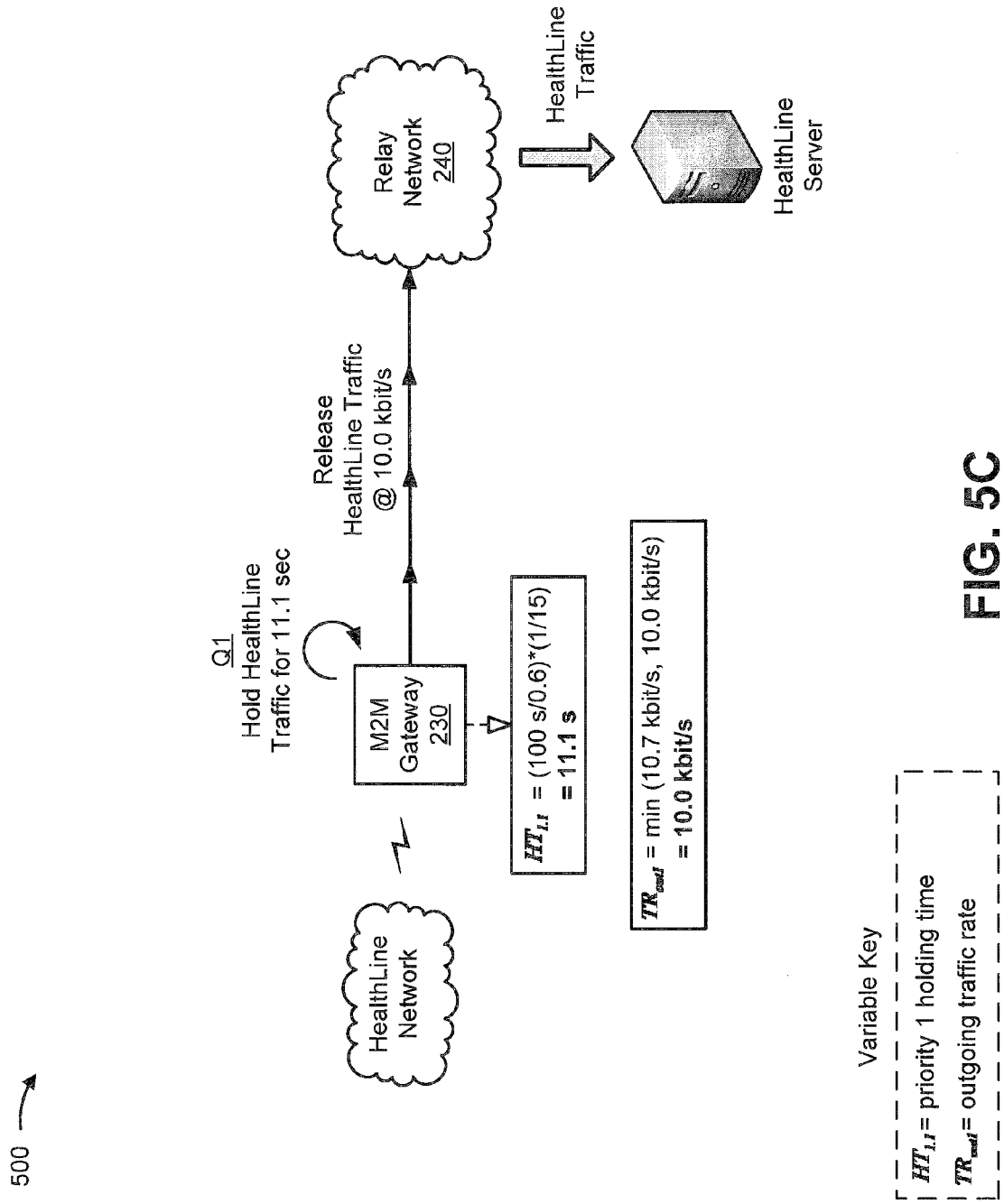

As shown in FIG. 5C, M2M gateway 230 may determine a priority level 1 holding time ("$HT_{1,1}$") (e.g., a Q1 holding time) that is to be applied to the HealthLine M2M traffic received during the first time window. As shown, M2M gateway 230 may determine the priority level 1 holding time based on the overall holding time (e.g., 100 sec), the priority 1 factor (e.g., 0.6), and the normalization factor (e.g., ⅟15). As shown, M2M gateway 230 may determine that the priority level 1 holding time to be applied to the HealthLine M2M traffic is 11.1 sec (e.g., (100 s/0.6)*(⅟15)=11.1 s). As further shown, M2M gateway 230 may hold the HealthLine M2M traffic for 11.1 seconds (e.g., measured from the end of the first time window) and may release the HealthLine M2M traffic (e.g., from Q1) at a rate of 10.0 kbit/s (e.g., the outgoing traffic rate determined by M2M gateway 230). As shown, the HealthLine M2M traffic may be sent to a HealthLine server, associated with the HealthLine M2M application, via relay network 240.

Figure 5D:
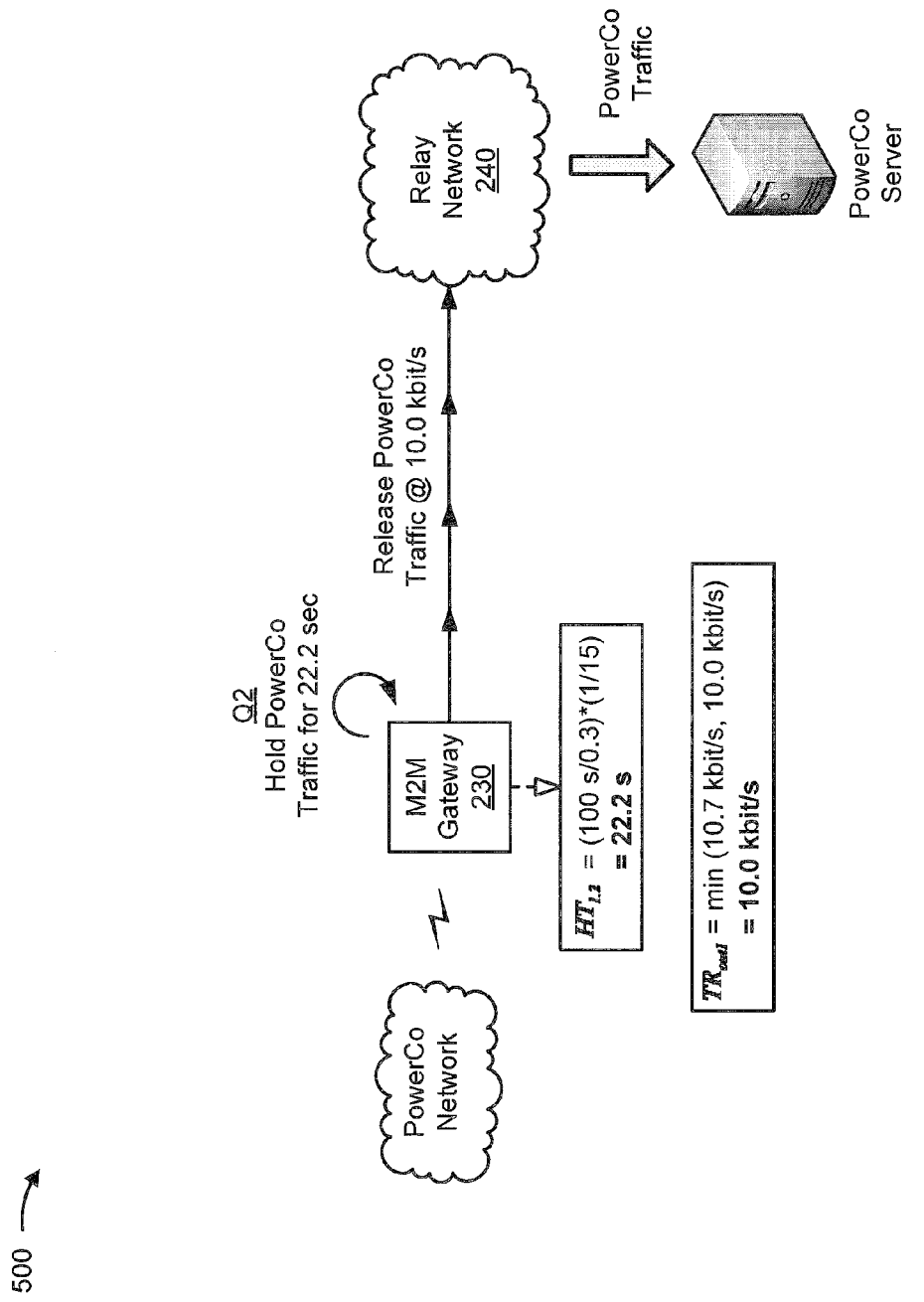

As shown in FIG. 5D, M2M gateway 230 may determine a priority level 2 holding time ("$HT_{1,2}$") (e.g., a Q2 holding time) that is to be applied to the PowerCo M2M traffic received during the first time window. As shown, M2M gateway 230 may determine the priority level 2 holding time based on the overall holding time (e.g., 100 sec), the priority 2 factor (e.g., 0.3), and the normalization factor (e.g., ⅟15). As shown, M2M gateway 230 may determine that the priority level 2 holding time to be applied to the PowerCo M2M traffic is 22.2 sec (e.g., (100 s/0.3)*(⅟15)=22.2 s). As further shown, M2M gateway 230 may hold the PowerCo M2M traffic for 22.2 seconds (e.g., measured from the end of the first time window) and may release (e.g., from Q2) the PowerCo M2M traffic at a rate of 10.0 kbit/s (e.g., the outgoing traffic rate determined by M2M gateway 230). As shown, the PowerCo M2M traffic may be sent to a PowerCo server, associated with the PowerCo M2M application, via relay network 240.

Figure 5E:
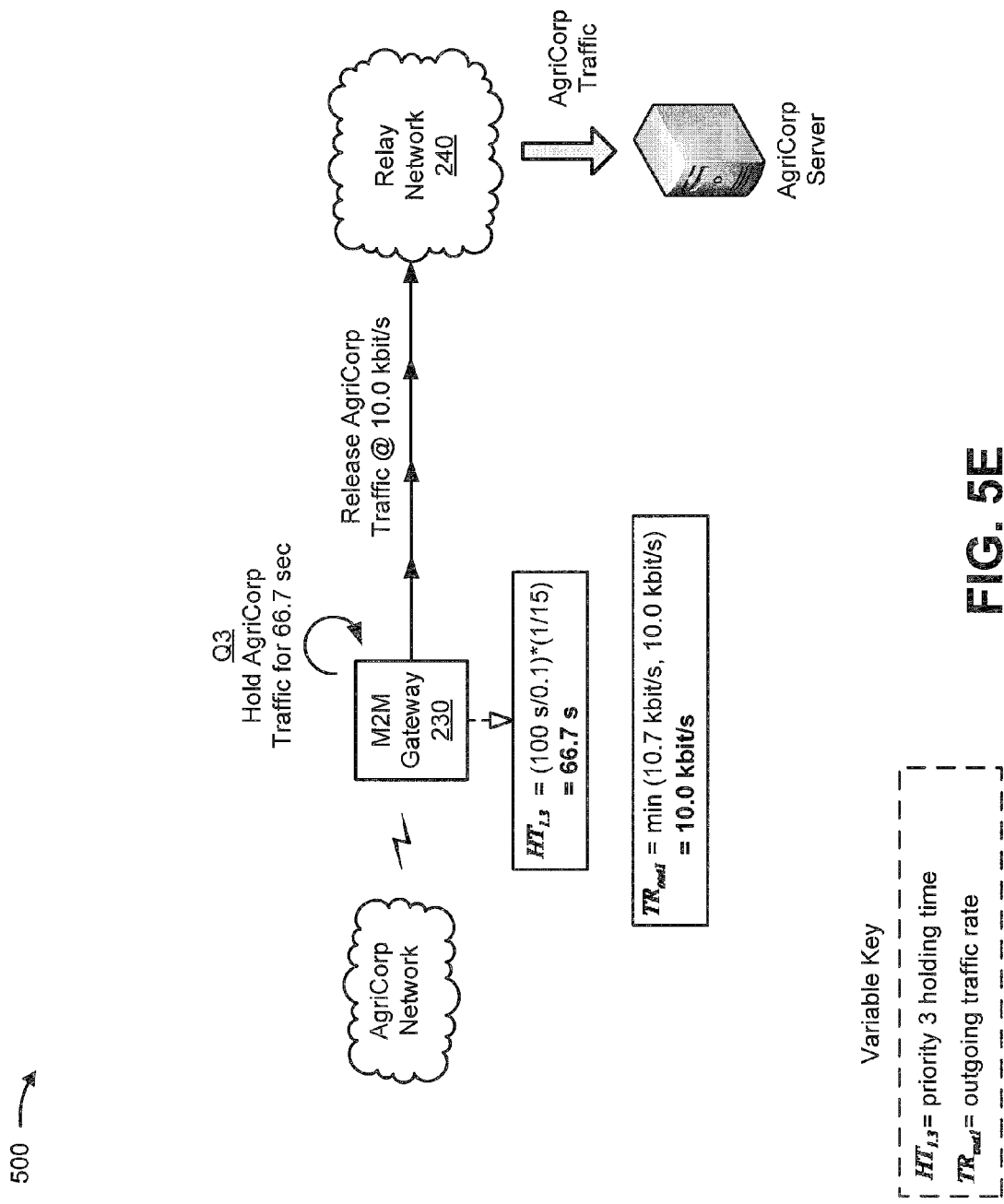

As shown in FIG. 5E, M2M gateway 230 may determine a priority level 3 holding time ("$HT_{1,3}$") (e.g., a Q3 holding time) that is to be applied to the AgriCorp M2M traffic received during the first time window. As shown, M2M gateway 230 may determine the priority level 3 holding time based on the overall holding time (e.g., 100 sec), the priority 3 factor (e.g., 0.1), and the normalization factor (e.g., ⅟15). As shown, M2M gateway 230 may determine that the priority level 3 holding time to be applied to the AgriCorp M2M traffic is 66.7 sec (e.g., (100 s/0.1)*(⅟15)=66.7 s). As further shown, M2M gateway 230 may hold the AgriCorp M2M traffic for 66.7 seconds (e.g., measured from the end of the first time window) and may release (e.g., from Q3) the AgriCorp M2M traffic at a rate of 10.0 kbit/s (e.g., the outgoing traffic rate determined by M2M gateway 230). As shown, the AgriCorp M2M traffic may be sent to an AgriCorp server, associated with the AgriCorp M2M application, via relay network 240.

The example implementations described in FIGS. 5C-5E may occur independently (e.g., each queue may be released without affecting another queue). For example, M2M gateway 230 may release the HealthLine M2M traffic 11.1 seconds after the end of the first time window at a rate of 10.0 kbit/s, and may release the PowerCo M2M traffic 22.2 seconds after the end of the first time window at a rate of 10.0 kbit/s (e.g., while continuing to release the HealthLine M2M traffic at 10.0 kbit/s). Similarly, M2M gateway 230 may release the AgriCorp M2M traffic 66.67 seconds after the end of the first time window at a rate of 10.0 kbit/s (e.g., while continuing to release the HealthLine M2M traffic at 10.0 kbit/s and the PowerCo M2M traffic at 10.0 kbit/s).

Figure 5F:
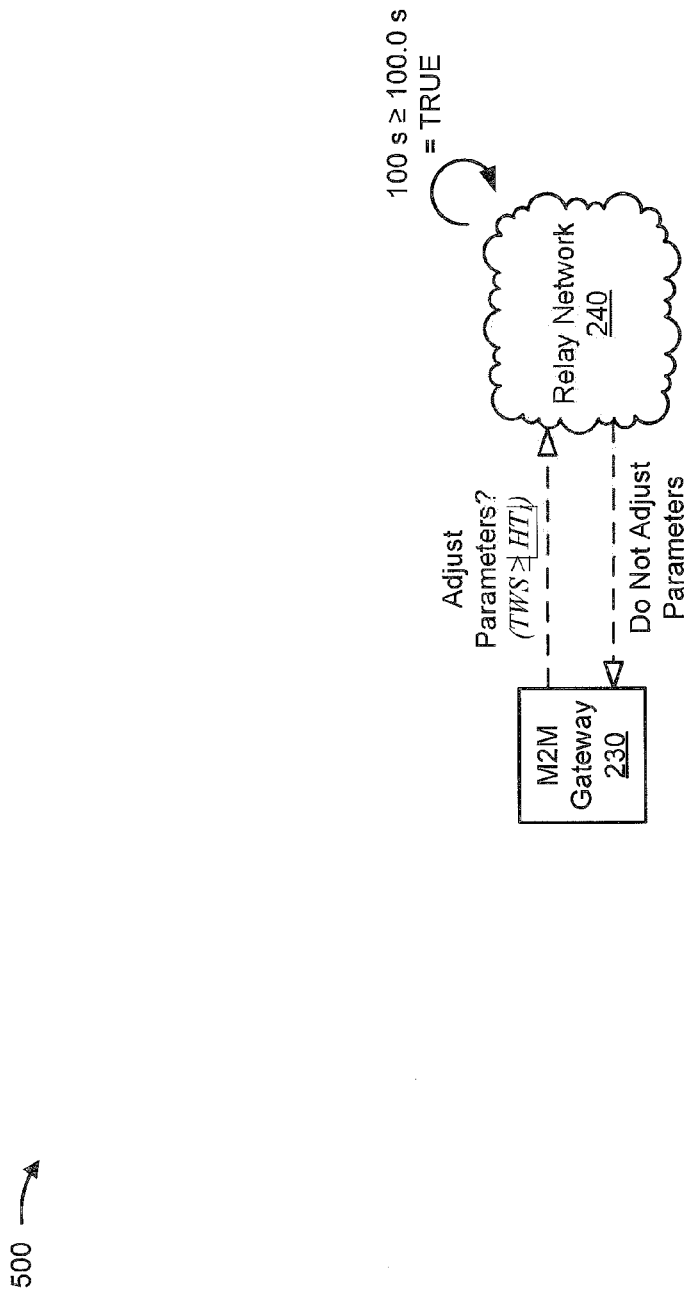

As shown in FIG. 5F, M2M gateway 230 may determine that the parameters are not to be adjusted (e.g., since the time window size ("TWS") used to determine the priority level holding times is not greater than the overall holding time determined by M2M gateway 230), and may continue managing the HealthLine M2M traffic, the PowerCo M2M traffic, and the AgriCorp M2M traffic in a second time window (e.g., using the same parameters that were used to manage the M2M traffic received during the first time window).

As indicated above, FIGS. 5A-5F are provided merely as an example. Other examples are possible and may differ from what was described with regard to FIGS. 5A-5F.

Implementations described herein may allow M2M traffic to be managed based on a priority level associated with the M2M traffic in a way such that the M2M traffic uses network resources in a steady and/or predictable manner.

The foregoing disclosure provides illustration and description, but is not intended to be exhaustive or to limit the implementations to the precise form disclosed. Modifications and variations are possible in light of the above disclosure or may be acquired from practice of the implementations. While the implementations described herein discuss M2M communication specifically, these implementations may also be applied to another type of communication with the same or similar characteristics of M2M communication.

As used herein, the term component is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   receive machine-to-machine (M2M) traffic associated with two or more M2M applications,
   the M2M traffic being associated with each of the two or more M2M applications and including information that identifies two or more priority levels associated with the M2M traffic;
   determine parameters associated with managing the M2M traffic;
   determine a traffic rate associated with the M2M traffic, the determination of the traffic rate being based on the parameters;
   determine an overall holding time associated with the M2M traffic,
   the overall holding time being based on the traffic rate and the parameters;
   determine an outgoing traffic rate to be applied to the M2M traffic,
   the outgoing traffic rate being based on the traffic rate and the parameters;
   determine a normalization factor based on the overall holding time and the parameters;
   determine a set of priority level holding times based on the normalization factor, the overall holding time, and the parameters,
   each priority level holding time, of the set of priority level holding times, being associated with a priority level of the two or more priority levels; and
   manage the M2M traffic based on the set of priority level holding times and the outgoing traffic rate.

2. The device of claim 1, wherein the one or more processors, when receiving the M2M traffic, associated with the two or more M2M applications, are further to: determine a first priority level for M2M traffic associated with a first M2M application; assign the M2M traffic, associated with the first M2M application, to a first M2M traffic queue; determine a second priority level for M2M traffic associated with a second M2M application; and assign the M2M traffic, associated with the second M2M application, to a second, different M2M traffic queue.

3. The device of claim 1, wherein the one or more processors are further to: determine a priority level factor to be applied to M2M data associated with a priority level; and wherein the one or more processors, when determining the normalization factor, are further to: determine the normalization factor based on the priority level factor.

4. The device of claim 1, wherein the one or more processors, when determining the set of priority level holding times, are further to: determine a first priority level holding time associated with a first priority level; and determine a second priority level holding time associated with a second priority level, the second priority level holding time being longer than the first priority level holding time.

5. The device of claim 1, wherein the one or more processors, when managing the M2M traffic, are further to: hold M2M traffic, associated with a first priority level, for a period of time equal to a first priority level holding time of the set of priority level holding times; release the M2M traffic, associated with the first priority level, at a rate equal to the outgoing traffic rate after the first priority level holding time; hold M2M traffic, associated with a second priority level, for a period of time equal to a second priority level holding time of the set of priority level holding times; and release the M2M traffic, associated with the second priority level, at a rate equal to the outgoing traffic rate after the second priority level holding time.

6. The device of claim 1, wherein the one or more processors, when determining the overall holding time, are further to: determine that the parameters are to be adjusted based on the overall holding time; and determine information identifying adjusted parameters.

7. The device of claim 1, wherein the set of priority level holding times is: a first set of priority level holding times, the outgoing traffic rate is a first outgoing traffic rate, and a time window is a first time window; and wherein the one or more processors are further to: determine a second set of priority level holding times and a second outgoing traffic rate associated with a second time window; and manage the M2M traffic based on the second set of priority level holding times and the second outgoing traffic rate.

8. A non-transitory computer-readable medium storing instructions, the instructions comprising: one or more instructions that, when executed by one or more processors, cause the one or more processors to:
receive traffic associated with two or more applications, the traffic being associated with each of the two or more applications and including information that identifies two or more priority levels associated with the traffic;
determine parameters associated with managing the traffic;
compute, based on the parameters, a traffic rate associated with the traffic;
compute, based on the traffic rate and the parameters, an overall holding period to be associated with the traffic;
determine an outgoing traffic rate to be associated with the traffic, the outgoing traffic rate being based on the traffic rate and the parameters;
compute a normalization factor based on the overall holding period and the parameters; determine a group of priority level holding periods based on the normalization factor, the overall holding period, and the parameters, each priority level holding period, of the group of priority level holding periods, being associated with a priority level of the two or more priority levels; and
manage the traffic based on the group of priority level holding periods and the outgoing traffic rate.

9. The non-transitory computer-readable medium of claim 8, wherein the one or more instructions, that cause the one or more processors to receive the traffic, associated with the two or more applications, further cause the one or more processors to: determine a first priority level for traffic associated with a first application; assign the traffic, associated with the first application, to a first traffic queue; determine a second priority level for traffic associated with a second application; and assign the traffic, associated with the second application, to a second, different traffic queue.

10. The non-transitory computer-readable medium of claim 8, wherein the one or more instructions, when executed by the one or more processors, further cause the one or more processors to: determine a priority level factor to be applied to data associated with a priority level; and where the one or more instructions, that cause the one or more processors to compute the normalization factor, further cause the one or more processors to: compute the normalization factor based on the priority level factor.

11. The non-transitory computer-readable medium of claim 8, wherein the one or more instructions, that cause the one or more processors to determine the group of priority level holding periods, further cause the one or more processors to: determine a first priority level holding period associated with a first priority level; and determine a second priority level holding period associated with a second priority level, the second priority level holding period being longer than the first priority level holding period.

12. The non-transitory computer-readable medium of claim 8, wherein the one or more instructions, that cause the one or more processors to manage the traffic, further cause the one or more processors to: hold traffic, associated with a first priority level, for a length of time equal to a first priority level holding period of the group of priority level holding periods; release the traffic, associated with the first priority level, at a rate equal to the outgoing traffic rate after the first priority level holding period; hold traffic, associated with a second priority level, for a length of time equal to a second priority level holding period of the group of priority level holding periods; and release the traffic, associated with the second priority level, at a rate equal to the outgoing traffic rate after the second priority level holding period.

13. The non-transitory computer-readable medium of claim 8, wherein the one or more instructions, that cause the one or more processors to compute the overall holding period, further cause the one or more processors to: determine that the parameters are to be adjusted based on the overall holding period; and determine information identifying adjusted parameters.

14. The non-transitory computer-readable medium of claim 8, wherein the group of priority level holding periods is: a first group of priority level holding periods, the outgoing traffic rate is a first outgoing traffic rate, and a time window is a first time window; and wherein the one or more processors, when executed by the one or more processors, further cause the one or more processors to: determine a second set of priority level holding periods and a second outgoing traffic rate associated with a second time window; and manage the traffic based on the second set of priority level holding periods and the second outgoing traffic rate.

15. A method, comprising:
receiving, by a device, machine-to-machine (M2M) traffic associated with a group of M2M applications, the M2M traffic including information that identifies a group of priority levels associated with the M2M traffic;

identifying, by the device, parameters associated with processing the M2M traffic;

determining, by the device, a traffic rate associated with the M2M traffic based on the parameters;

calculating, by the device, an overall holding time associated with the M2M traffic based on the traffic rate and the parameters;

selecting, by the device, an outgoing traffic rate to be applied to the M2M traffic,
the outgoing traffic rate being selected based on the traffic rate and the parameters;

calculating, by the device, a normalization factor based on the overall holding time and the parameters;

determining, by the device, a plurality of priority level holding times based on the normalization factor, the overall holding time, and the parameters,
each priority level holding time, of the plurality of priority level holding times, being associated with a priority level of the group of priority levels; and processing, by the device, the M2M traffic based on the plurality of priority level holding times and the outgoing traffic rate.

16. The method of claim 15, wherein receiving the M2M traffic, associated with the group of M2M applications, further comprises: determining a first priority level for M2M traffic associated with a first M2M application; assigning the M2M traffic, associated with the first M2M application, to a first M2M traffic queue; determining a second priority level for M2M traffic associated with a second M2M application; and assigning the M2M traffic, associated with the second M2M application, to a second, different M2M traffic queue.

17. The method of claim 15, further comprising: determining a priority level factor to be applied to M2M data associated with a priority level; and wherein calculating the normalization factor further comprises: calculating the normalization factor based on the priority level factor.

18. The method of claim 15, wherein determining the plurality of priority level holding times further comprises: determining a first priority level holding time associated with a first priority level; and determining a second priority level holding time associated with a second priority level, the second priority level holding time being longer than the first priority level holding time.

19. The method of claim 15, wherein processing the M2M traffic further comprises: holding M2M traffic, associated with a first priority level, for a period of time equal to a first priority level holding time of the plurality of priority level holding times; releasing the M2M traffic, associated with the first priority level, at a rate equal to the outgoing traffic rate after the first priority level holding time; holding M2M traffic, associated with a second priority level, for a period of time equal to a second priority level holding time of the plurality of priority level holding times; and releasing the M2M traffic, associated with the second priority level, at a rate equal to the outgoing traffic rate after the second priority level holding time.

20. The method of claim 15, wherein the plurality of priority level holding times is: a first plurality of priority level holding times, the outgoing traffic rate is a first outgoing traffic rate, and a time window is a first time window; and wherein the method further comprises: determining a second plurality of priority level holding times and a second outgoing traffic rate associated with a second time window; and processing the M2M traffic based on the second plurality of priority level holding times and the second outgoing.

* * * * *